United States Patent [19]
Cowan

[11] 3,805,109
[45] Apr. 16, 1974

[54] WEDGE SHAPED RASTER GENERATION

[75] Inventor: John G. Cowan, Panama City, Fla.

[73] Assignee: The United States of America as represented by the Secretary of the Navy, Washington, D.C.

[22] Filed: Nov. 3, 1972

[21] Appl. No.: 303,665

[52] U.S. Cl. .................................. 315/23, 340/3 C
[51] Int. Cl. ............................................. H01j 29/70
[58] Field of Search .................. 315/23, 24, 18, 19; 340/3 A

[56] References Cited
UNITED STATES PATENTS
| | | | |
|---|---|---|---|
| 3,559,158 | 1/1971 | Bettcher | 340/3 A |
| 3,684,915 | 8/1972 | Gangawere | 315/23 |
| 3,716,749 | 2/1973 | Colby et al. | 315/23 |
| 2,677,785 | 5/1954 | Owen | 315/24 |

Primary Examiner—Richard A. Farley
Assistant Examiner—J. M. Potenza
Attorney, Agent, or Firm—Richard S. Sciascia; Don D. Doty; Harvey A. David

[57] ABSTRACT

Circuitry is disclosed for generating a pie wedge shaped CRT raster characterized by curved lines, each having the same center of curvature, whereby the range scale is uniform throughout the raster when used as a sonar display. The disclosed circuitry produces a modulated sawtooth deflection signal and a clipped and modulated hyperbolic voltage waveform, the effect of which is added to that of the normal range deflection voltage ramp to produce the desired raster.

5 Claims, 4 Drawing Figures

WEDGE SHAPED RASTER GENERATION

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to sonar displays on cathode ray tubes, and more particularly to apparatus for generating an improved, wedge shaped scanning raster. Wedge shaped display scans are used in conjunction with sonar, particularly those of the type wherein a plurality of transducers are used in a composite beam forming array and are electronically scanned at a high rate during each projection period. From such a display, the target range, bearing, and aspect angle can be readily determined.

DESCRIPTION OF THE PRIOR ART

Wedge shaped scan generators used in the aforementioned sonar display situations are typified by U.S. Pat. No. 2,800,607, issued to R. H. Mathes July 23, 1957. In accordance with that patent, a sawtooth voltage waveform is generated which starts with and progressively increases in amplitude during each pulse transmission. That increasing sawtooth voltage waveform has a frequency which is directly related to the transducer scan rate and is applied to one set of deflection plates of an electrostatic CRT (cathode ray tube) while a ramp voltage is applied to the other set of deflection plates. The ramp voltage increases in proportion to time during each transmission period. The cathode ray is intensified in response to echoes and will therefore provide an indication or pip, the location of which within the wedge shape display area will correspond to bearing and to range.

While the foregoing type of electrostatic CRT wedge shaped display has been used with considerable success, it is subject to a number of important limitations. Among these are size limitations common to electrostatic CRT's, and difficulties in coupling sonar video to the cathode because the latter must be operated at several KV below ground potential. Last but not least, is the fact that the display, as generated in accordance with the mentioned patent, requires a range scale which varies from the center or zero bearing to either side or outer bearing. Accordingly, typical CRT drawn range circles, such as the expanding type coupled to a direct range readout, cannot be used. Moreover, long targets presenting a substantial aspect angle will appear to be bent, while those presenting small aspect angles may be foreshortened.

The generation of wedge shaped display rasters by CRT's using electromagnetic deflection overcomes the size and video coupling problems inherent with electrostatic CRT's but has been hampered by the added size, weight and expense of heavy power amplifiers necessary to drive the deflection coils at the higher scanning frequencies characteristic of the sonars concerned.

SUMMARY OF THE INVENTION

The subject invention overcomes most of the disadvantages of the aforementioned prior art in that it contains resonant deflection circuitry which permits the use of electromagnetic deflection and its attendant advantages in generating a wedge shaped raster, and in that the deflection circuitry contains novel curvature generating means which results in a pie wedge shaped raster having substantially arcuately curved raster lines.

With the foregoing in mind, it is a principal object of the invention to provide improved wedge shaped raster generation.

Another object of the invention is the provision of deflection signal generating circuitry for forming on a CRT display, a pie wedge shaped raster which is characterized by arcuately curved raster lines all of which have a common center of radius, so that in systems wherein distance from said center is representative of range, the same range scale can be utilized throughout the display.

Another object of the invention is the provision of deflection signal generating circuitry of the foregoing character in combination with an electromagnetic deflection CRT display wherein the deflection coils form part of a resonant system, thereby substantially reducing power and power amplifier requirements while permitting larger displays than are practicable with electrostatic deflection systems now in use.

Still another object of the invention is the provision of deflection signal generating circuitry which is inexpensive, compact, and can be readily installed as a modification to inexpensive commercially available television monitoring types of CRT displays.

As another object this invention aims to accomplish the foregoing through the provision of a novel circuit for modulating the normal sawtooth waveform of the horizontal deflection circuitry of a conventional TV monitor to provide an output which is sawtooth waveform having linearly increasing peak amplitudes and a novel circuit for generating a modulated hyperbolic waveform voltage, the effect of which is algebraically added to that of the voltage ramp output of the vertical deflection signal generator of the TV monitor.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
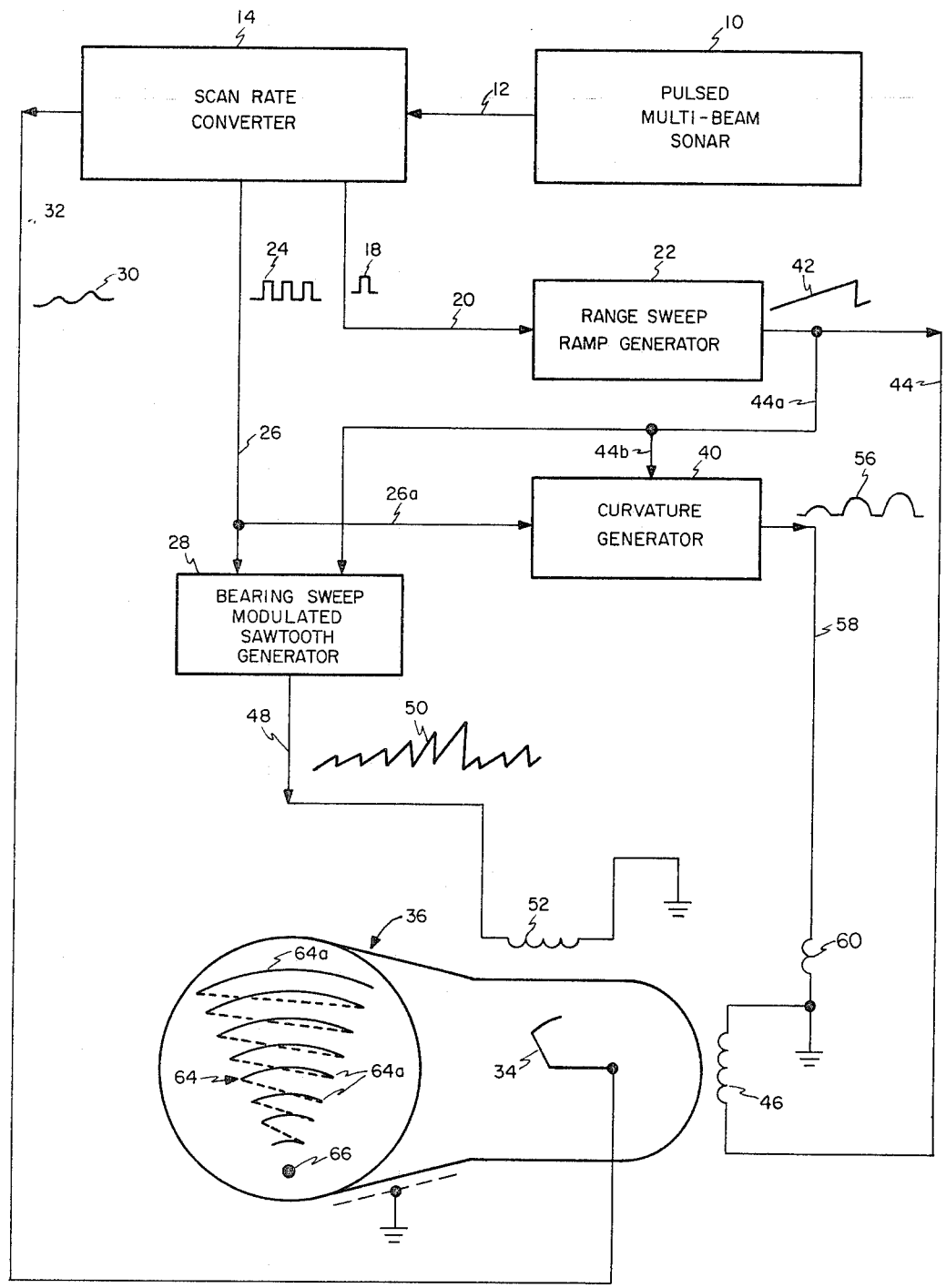
FIG. 1 is a diagrammatic illustration, in block form, of a sonar system having a raster generating means embodying the invention.

Referring to FIG. 1, the invention will be described as it is used in association with a pulsed multi beam sonar 10 of the type wherein a plurality of transducers are simultaneously pulsed to cause sound energy to be transmitted into the surrounding medium, usually sea water. Thereafter, in the interval preceding a subsequent transmission pulse, the transducers are sequentially scanned in a receiving mode to detect echo returns. Sonars of this type are well known and the earlier mentioned U.S. Pat. No. 2,800,607 and also U.S. Pat. No. 3,307,141 are examples of early forms thereof, more recent versions being characterized by more, narrower beam transducers.

Because the transmission pulse repetition rate is relatively low, an objectionable flicker is apparent in a CRT presentation having a raster operating at one field per transmission. Accordingly, the video and scansion timing signal outputs of the sonar 10, which are generally represented by flow line 12, are applied to a scan rate converter 14. Converter 14, which forms no part of the invention per se, may comprise any suitable memory and readout means which will provide a field rate which will assure a flicker-free presentation.

Converter 14 provides as outputs range sweep sync signals 18 which are applied as shown by line 20 to a range sweep ramp generator 22, bearing sweep rate trigger signals 24 which are applied as shown by line 26 to a bearing sweep modulated sawtooth generator 28, and video signals 30 which are applied as shown by line 32 to the cathode 34 of a cathode ray tube 36. The bearing sweep rate trigger signals 24 are also fed, as shown by line 26a, to a curvature generator 40, later described in detail with reference to FIG. 2. All of the foregoing signals may be regarded as voltage signals, although it will be understood that the functions thereof may also be accomplished by corresponding current fluctuation signals. The same is true with respect to other signals discussed hereinafter.

The range sweep ramp generator 22 serves to generate a range sweep deflection signal shown as a voltage ramp 42 applied as shown by lines 44 and 44a to a range deflection coil 46 associated with the cathode ray tube 36 and to the bearing sweep modulated sawtooth generator 28, respectively. The ramp 42 is also applied as shown by line 44b as an input to the curvature generator 40.

The bearing sweep modulated sawtooth generator 28, later described in more detail with reference to FIG. 5, is responsive to the bearing sweep rate trigger signals 24 and to the range sweep ramp 42 to provide, as its output on line 48, modulated sawtooth signals 50. The signals 50 are applied to a bearing deflection coil 52 associated with the cathode ray tube 36, and operationally orthogonal to the coil 46.

At this time, it should be noted that the cathode ray tube 36, its deflection coils 46 and 52, may comprise a conventional, inexpensive, television cathode ray tube with its conventional vertical and horizontal deflection coils. Also, the range sweep ramp generator conveniently comprises the conventional vertical sweep ramp generator of a television monitor using resonant electromagnetic deflection. Both the range sweep ramp generator 22 and the bearing sweep modulated sawtooth generator cooperate with their respective deflection coils 46 and 52 to operate in the manner of resonant circuits, thereby reducing weight, power, and cost requirements which would be attendant to fully driven electromagnetic deflection coils when operated at the frequencies necessary to eliminate flicker.

As thus far described, the apparatus embodying the invention differs from the mentioned Mathes patent in the matter of scan rate conversion and the important matter of using a readily available electromagnetic television monitor cathode ray tube, deflection coils, and vertical (range) sweep signal generator. Operation at this point, however, would provide a wedge shaped raster which would be flicker free but would share with those patents the disadvantage of having a range scale that varies from place to place or bearing to bearing within the raster.

It is to obviate these range scale variations that the invention includes, in combination with the aforedescribed apparatus, the curvature generator 40. This generator is responsive to the bearing sweep rate trigger signals 24 and to the range voltage ramp 42 to provide, in a manner which will presently be made apparent, output signals 56 which are characterized as a series of curved humps of progressively increasing amplitude, one for each trigger signal 24. The curvature signal output of the generator 40 is applied as shown by line 58 to an auxiliary or supplementary range sweep deflection coil 60. The supplemental coil 60, which conveniently comprises a small number of turns laid adjacent to the existing range sweep deflection coil 46, serves to algebraically add to the cathode ray deflection occasioned by the ramp 42 additional deflections corresponding to the humps of curvature signal 56. The humps of the curvature signal 56 are timed to coincide in duration with each tooth of the modulated sawtooth generator output signals 50, with the result that the resulting raster 64 traced on the face of the cathode ray tube 36 comprises lines 64a which are curved about a substantially common center of curvature 66. Thus, the raster 64 has substantially the same range scale throughout its area without material variation from side to side as has been the case heretofore.

Figure 2:
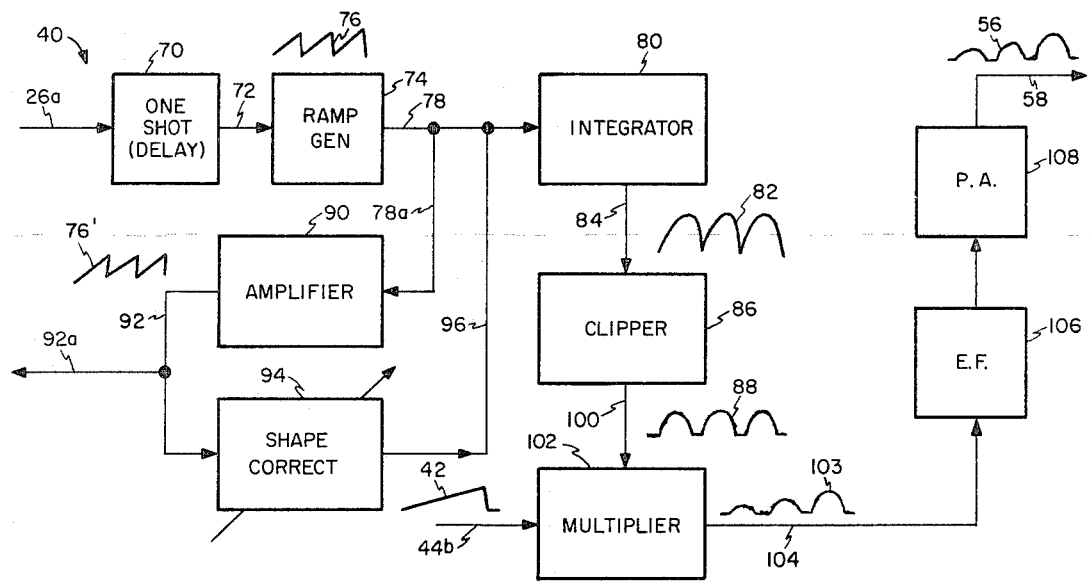
FIG. 2 is a more detailed diagrammatic illustration, in block form, of a portion of the system of FIG. 1.

Referring now to FIG. 2, curvature generator 40 will be described in more detail. Thus, generator 40 comprises a variable delay means which may be in the form of a monostable multivibrator or one-shot 70 which accepts the trigger signals 24 on line 26a as an input and releases a predetermined output voltage level change at a selected time after being triggered by the signals 24. The output of the one-shot 70 is fed as shown by line 72 to a linear voltage ramp or sawtooth generator 74 which provides one tooth or ramp for each trigger signal 24, but at a time determined by the delay introduced by one-shot 70 for a purpose which will presently be made apparent.

The sawtooth output 76 of the generator 76 is applied via line 78 to an integrator 80, the output 82 of which is a hyperbolic voltage waveform on line 84 leading to a clipper 86. The clipper 86, which may be variable for calibration purposes, removes the negative peaks of the input voltage waveform 82 to provide a clipped output voltage waveform 88 which is characterized as a series of curved humps that are spaced from one another along their baseline, as shown in FIG. 2.

Figure 3:
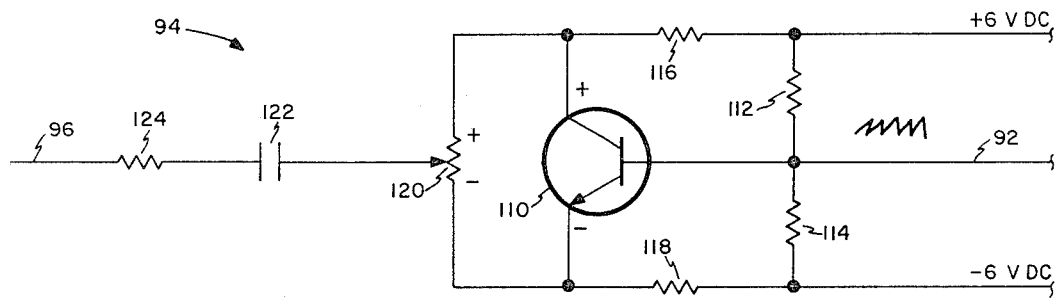
FIG. 3 is a schematic illustration of a shape correction circuit.

The sawtooth waveform 76 on line 78 is also applied via a line 78a to an amplifier 90, the sawtooth output 76' of which on line 92 is fed as the input to a shape correction circuit 94. The latter circuit, shown in detail in FIG. 3, provides positive or negative feedback via line 96 to the input line 78 of the integrator 80, in accordance with a control setting as will be described below. The shape correction circuit 94 is variable as to polarity and magnitude of feedback ot the integrator and thereby serves as a shape control for the integrator output 82, and hence of the waveform 88. The amplifier 90 conveniently serves also as a low impedance source, via line 92a, of a bearing sweep rate sawtooth voltage waveform for use in other portions of the CRT display not directly bearing on the invention, e.g., convergence control.

The output 88 of the clipper 86 is fed via line 100 to a multiplier 102 which receives as a second input, via line 44b, the voltage ramp 42. The multiplier 42, which may be any one of a number of commercially available units capable of providing an output voltage which varies directly as the product of two input voltages, provides a voltage output 103 on line 104 which is the product of the ramp 42 and the waveform 88. Thus, the output 103 is characterized as a modulated series of curved voltage humps which progressively increase in amplitude. The output 103 is fed to an emitter follower 106 which drives a power amplifier 108, normally a single stage transistor amplifier. The output of the amplifier 108 constitutes the previously mentioned series of voltage humps 56, which output is directly connected by line 58 to the supplementary range deflection coil to add its effect to the deflection effected by the ramp 42. At this point it should be noted that the variable delay one-shot 71 may be used to ensure that the voltage humps 56 occur in registration with each tooth of the modulated sawtooth waveform 50, so that the curvature of the resulting lines 64a will be appropriately centered.

The shape correction circuit 94 (see FIG. 3) comprises an NPN transistor 110 having its base connected to the juncture of biasing resistors 112 and 114 forming a voltage divider between positive and negative 6 volt D.C. voltage sources, the base being connected to receive the incoming sawtooth waveform via line 92 from the amplifier 90. The collector of the transistor 110 is connected to the positive 6 volt source via a resistor 116 while the emitter is connected to the negative 6 volt source via a resistor 118. In one practical embodiment the resistor 112 had a value of 15K, resistor 114 a value of 10K, and resistors 116 and 118 a value of 1K. A 5K potentiometer 120 is connected across the collector and emitter of the transistor and voltage tapped off by the wiper of the potentiometer 120 is coupled via a capacitor 122, a resistor 124, and line 96 to the input line 78 to the integrator 80. As mentioned earlier, adjustment of the correction conduit 94, through the agency of the potentiometer 120, permits feedback which is selected as to polarity and potential to vary the shape of the output of the integrator 80 and hence the curvature of the lines 64a of the raster 64.

Figure 4:
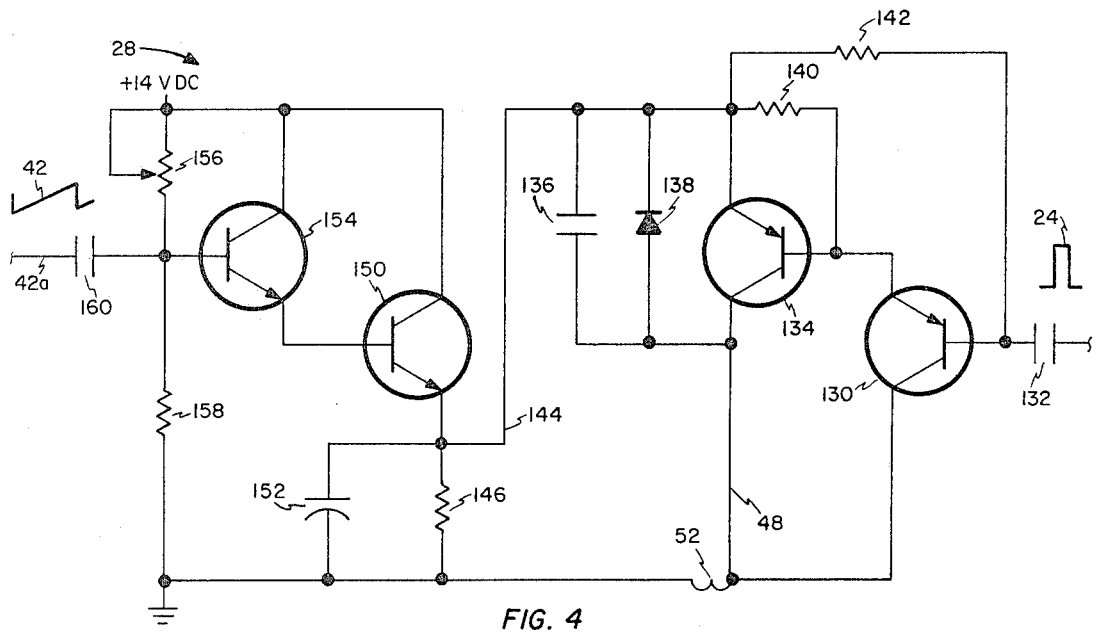
FIG. 4 is a schematic illustration of a modulated sawtooth generating circuit.

Referring to FIG. 4, the bearing sweep modulated sawtooth generator 28 comprises basically a sawtooth generating circuit which comprises a PNP transistor 130, to the base of which input pulses 24 on line 26 are coupled by a capacitor 132. The emitter of transistor 130 is directly coupled to the base of a PNP transistor 134, while the collector of transistor 130 is connected to that of transistor 134 and to the line 48 connected to the bearing deflection coil 52. A capacitor 136 and a diode 138 are connected across the emitter and collector of the transistor 134, and biasing resistors 140 and 142 are connected from the emitter of transistor 134 to the bases of the transistors 134 and 130, respectively. A voltage supply which varies in accordance with the range sweep ramp signal input on line 44a is applied via conductor 144 from a resistor 146 connected as a load in the collector-emitter circuit of an NPN transistor 150, and in parallel with a capacitor 152.

The transistor 150 is connected to an NPN transistor 154 to form a Darlington pair, with the base of the transistor 154 deriving its bias from a voltage divider comprised of a variable resistor 156 and a fixed resistor 158 which are connected between a positive 14 volt D.C. source and ground. The range sweep ramp signals 42 on line 44a are coupled to the base of the transistor 154 by a capacitor 160, and the pair of transistors serves to relieve the drive requirements of the range ramp signals in modulating the raster width in accordance with range. This it does by providing, at the ramp rate, a varying voltage across the resistor 146, which voltage represents the voltage supply to the sawtooth forming part of the circuit including transistors 130 and 134.

Each trigger pulse 24, through the action of transistor 130 causes the transistor 134 to supply a voltage pulse to the deflection coil 52. The coil 52 integrates this pulse and the resultant current through the coil is a ramp. The succession of pulses 24 results in a succession of ramps, or a sawtooth waveform. Meanwhile, because the voltage supply taken from resistor 146 increases linearly during each range ramp, the sawtooth waveform, and the current through the coil 52 is modulated to produce a wedge shaped raster. Of course, it will be remembered concurrent effects of the range ramp in the deflection coil 46 and of the curvature waveform 56 in the supplementary range deflection coil 60 results in the curved bearing sweep lines 64a.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. In a multi-beam sonar system of the type having a plurality of transducer elements which are simultaneously pulsed to provide a sonic transmission and are then scanned to detect return signals which are characteristic of bearing and range of a reflecting target, scan conversion means for providing bearing sweep rate trigger signals, range sweep sync signals and video signals, and a cathode ray tube for display, improved wedge shaped raster generating apparatus comprising:

a range sweep ramp generator, connected to receive said range sweep sync signals, for generating a linear voltage ramp which increases in direct proportion to time beginning with each sonic transmission;

a first range sweep electromagnetic deflection coil associated with said cathode ray tube and connected for resonant cooperation with said voltage ramp generator to effect deflection of the electron beam of said cathode ray tube in a first direction;

a bearing sweep modulated sawtooth generator, connected to receive said bearing sweep rate trigger signals and said linear voltage ramp, for generating a sawtooth voltage waveform having teeth occurring at the bearing sweep rate and increasing in amplitude in accordance with said linear voltage ramp;

a bearing sweep electromagnetic deflection coil associated with said cathode ray tube and connected for resonant cooperation with said modulated sawtooth generator to deflect said electron beam in a second direction, whereby a wedge shaped raster is traced on the face of said cathode ray tube;

a curvature generator means, connected to receive said bearing sweep rate trigger signals, for generating a voltage waveform comprising a series of spaced, curved voltage humps of progressively increasing amplitude occurring at the rate of said trigger signals;

a supplementary range sweep electromagnetic deflection coil, associated with said cathode ray tube and cooperatively connected to said curvature generator, for effecting supplementary range deflection of said electron beam in said first direction, whereby lines of said wedge shaped raster are curved about a substantially common center of curvature; and said curvature generator means comprising ramp generator means, connected to be responsive to said bearing sweep rate trigger signals, for generating a sawtooth voltage waveform at the bearing sweep rate, integrator means, connected to be responsive to said sawtooth voltage waveform, for generating as an output a series of adjacent substantially hyperbolic voltage curves, clipper means, connected to remove peaks between said hyperbolic voltage curves, for generating a series of spaced, curved voltage humps of like amplitude, and multiplier means, connected to said clipper means, for providing an output which is the product of said spaced, curved voltage humps of like amplitude and of said linear voltage ramp.

2. Apparatus as defined in claim 1, and wherein said curvature generator means further comprises:

shape correction circuit means, connected to be responsive to the output of said ramp generator means, for altering the input to said integrator means, so as to correspondingly alter the shape of the output thereof.

3. Apparatus as defined in claim 2, and wherein said shape correction circuit means comprises:

a transistor having base, collector, and emitter connections;

voltage divider means for providing bias to said base connection and comprising first and second resistors connected between positive and negative voltage supplies;

a third resistor connected between said positive voltage supply and one of said collector and emitter connections;

a fourth resistor connected between said negative voltage supply and the other of said collector and emitter connections;

a potentiometer having its resistance element connected across said collector and emitter connections and having a wiper cooperating with said resistance element;

said base connection being coupled to the output of said ramp generator; and said wiper being coupled to the input of said integrator means, whereby positioning of said wiper permits selection of both polarity and amplitude of the output of said shape correction circuit means to said integrator means.

4. Apparatus as defined in claim 3, and wherein said bearing sweep modulated sawtooth generator comprises:

a first pair of directly coupled transistors;

a load resistor connected in the collector-emitter circuit of one of said transistors;

said first pair of transistors being responsive to said linear voltage ramp to provide correspondingly varying voltage across said load resistor;

a second pair of directly coupled transistor connected to utilize said varying voltage as a supply;

a capacitor connected between said resistor and said bearing sweep deflection coil; and said transistors being responsive to said bearing sweep rate trigger signals to supply correspondingly timed pulses, but with increasing voltage levels to said coil.

5. In a cathode ray tube display system including first and second deflection coil means for deflecting an electron beam in first and second component directions, and sources of video signals, first component direction sync signals, and second component direction raster generating circuitry comprising:

a first voltage ramp generator for providing first voltage ramp signals as an output and connected to said first coil means so as to effect beam deflection in said first component direction in response to said sync signals;

a modulated sawtooth voltage waveform generator connected to said second deflection coil means and operative to effect beam deflection in said second component direction in response to said first voltage ramp signals and to said trigger signals;

a third deflection coil means for deflecting said electron beam in said second component direction;

a curvature voltage waveform generator connected to said third deflection coil means and operative to effect additional beam deflection in said second component direction in response to said trigger signals;

said modulated sawtooth voltage waveform generator comprising a first pair of directly coupled transistors, a load resistor connected in the collector-emitter circuit of one of said transistors, said first pair of transistors being responsive to said output of said first voltage ramp generator to provide a correspondingly varying voltage across said load resistor, a second pair of directly coupled transistor connected to utilize said varying voltage as a supply, a capacitor and a diode connected in parallel between said resistor and said second deflection coil means and cooperating with said second pair of transistors to operate as a second ramp generator which operates at a repetition rate determined by said trigger signals to provide a sawtooth waveform having increasing tooth amplitude;

said curvature voltage waveform generator comprising a third ramp generator connected to provide a second sawtooth waveform at the rate of said trigger signals, integrator means connected to be responsive to said second sawtooth waveform for generating a series of adjacent and substantially hyperbolic voltage curves characterized by sharp peaks where said curves adjoin, clipper means connected to said integrator means and operative to remove said peaks so as to provide an output in the form of a series of curved voltage humps spaced from one another, multiplier means, connected to said clipper means, and responsive to said first voltage ramp signals, for providing an output to said third deflection coil means in the form of a series of spaced voltage humps which progressively increase in amplitude, and time delay means for centering said additional beam deflection due to said third deflection coil means with respect to deflection due to said first deflection coil means; and a shape correction circuit comprising a potentiometer, transistor means connected to said potentiometer and responsive to said second sawtooth waveform to provide corresponding voltage excursions across said potentiometer, said potentiometer having its wiper connected to the input of said integrator.

* * * * *